United States Patent [19]

Berzin et al.

[11] 4,426,592

[45] Jan. 17, 1984

[54] ELECTRICAL MACHINE WITH SUPERCONDUCTING INDUCTOR AND GAS COOLING OF NORMAL-CONDUCTIVITY WINDINGS

[76] Inventors: Evgeny K. Berzin, ulitsa Sverdlova, 175, kv. 181; Anatoly G. Miroshnichenko, ulitsa Sluzhebnaya, 53, kv. 2; Leonid I. Yantovsky, ulitsa 23 Avgusta, 40, kv. 51, all of Kharkov, U.S.S.R.

[21] Appl. No.: 342,013

[22] PCT Filed: May 30, 1980

[86] PCT No.: PCT/SU80/00090

§ 371 Date: Jan. 18, 1982

§ 102(e) Date: Jan. 18, 1982

[87] PCT Pub. No.: WO81/03585

PCT Pub. Date: Dec. 10, 1981

[51] Int. Cl.³ .............................................. H02K 9/00
[52] U.S. Cl. ........................................ 310/52; 310/64; 310/258
[58] Field of Search ................... 310/10, 52, 53, 55, 310/57, 58, 60, 61, 40 R, 64, 65, 59, 62, 63, 256, 254, 258

[56] References Cited

U.S. PATENT DOCUMENTS

| 2,427,731 | 9/1947 | Lynn | 310/58 |
| 3,457,439 | 7/1969 | Gering | 310/52 |
| 3,742,265 | 6/1973 | Smith | 310/52 |
| 3,932,778 | 1/1976 | Watanabe | 310/61 |
| 4,020,373 | 4/1977 | Yamamoto | 310/61 |
| 4,058,746 | 11/1977 | Mole | 310/10 |
| 4,233,533 | 11/1980 | Lown | 310/53 |

FOREIGN PATENT DOCUMENTS

1404173  8/1964  France ........................... 310/40 R

Primary Examiner—R. Skudy
Attorney, Agent, or Firm—Lilling & Greenspan

[57] ABSTRACT

The electrical machine comprises a stator 1 with a superconducting winding 5 disposed in a cryostat 4 and a rotor 7 with a cooling winding 10 disposed on the rotor body. The stator also carries a compensating winding 6. The cryostat 4 is secured to the stator 1 so as to define a gap for the passage of a gaseous coolant between the external surface of the cryostat 4 and the normal-conductivity stator winding 6. The system of passages in the stator 1 and in the rotor 7 forms a circuit wherethrough the gaseous coolant flows; the coolant may circulate in a closed cooling system, said circuit forming a part of the cooling system.

5 Claims, 7 Drawing Figures

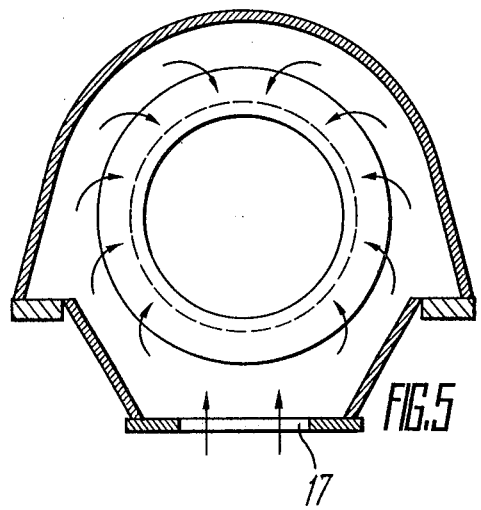
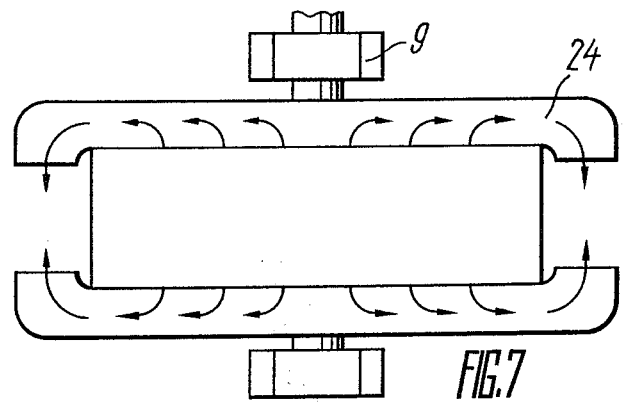

ELECTRICAL MACHINE WITH SUPERCONDUCTING INDUCTOR AND GAS COOLING OF NORMAL-CONDUCTIVITY WINDINGS

BACKGROUND OF THE INVENTION

1. Technical Field

The present invention relates to the field of electrical engineering and is specifically concerned with electrical machines with a superconducting inductor and a gas cooling of normal-conductivity windings.

2. Background Art

There has been proposed an electrical machine (French Pat. No. 1,404,173) comprising a rotor and a stator, whereon windings are disposed. The stator winding is made of a superconducting alloy and arranged inside a cryostat intended to maintain temperatures at which the superconducting state of the winding is possible. The cryostat includes a set of coaxial cylinders interconnected at their end portions. The winding is cooled with a low-temperature liquid coolant which provides for the superconducting state of the winding, such as with liquid helium (He).

The rotor, mounted in rotation bearings and made of an epoxy resin reinforced with prestressed glass fibers, carries the rotor winding made of a normal-conductivity conductor, the rotor winding conductors having passages for a direct cooling.

The rotor is encompassed on the outside by the internal surface of the cryostat housing which is secured on the rotor rotation bearings. The cryostat with the superconducting stator winding is encompassed on the outside by a large-thickness ferromagnetic casing; the casing may be the outside wall of the cryostat housing and protect from the external atmospheric pressure.

The terms "external surface of the cryostat" and "internal surface of the cryostat" will hereinafter denote the cryostat housing surfaces which face the stator and the rotor respectively.

The use of a rotor winding with a direct cooling results in a non-uniform temperature distribution over the winding length, since the coolant is heated as it flows along the cooling passage provided inside the winding conductors. This heating causes a premature thermal ageing of the insulation in the zone of higher temperatures of the winding and hence impairs the operational dependability of the machines.

The fastening of the cryostat housing on the rotor rotation bearings causes the rotor vibration arising from a remaining unbalance of the rotor as well as the vibration originating in working members of driven mechanisms be transmitted to the stator's superconducting winding, which affects the stability of its operation and impairs the operational dependability of the machine.

SUMMARY OF INVENTION

The invention has as its aim to provide such an electrical machine with a superconducting inductor and a gas cooling of normal-conductivity windings, wherein the relative arrangement of cooled machine units and cooling system passages ensure equalization the temperature over the length of the stator and rotor windings along with a break of the mechanical coupling which transmits vibration from the rotor to the superconducting winding of the stator, whereby the operational dependability is enhanced.

The aim set forth is attained by an electrical machine with a superconducting inductor and a gas cooling of normal-conductivity windings, comprising a stator with a superconducting winding disposed in a cryostat and a rotor with a cooled winding disposed on its body, the rotor being mounted in rotation bearings. According to the invention, the stator carries a winding which balances the electromagnetic moment of the rotor, acting upon the superconducting winding of the stator, and which is made of normal-conductivity conductors. The stator is provided with a housing to whose walls the cryostat is secured so as to define a gap for the passage of a gaseous coolant between the external surface of the cryostat and the normal-conductivity winding of the stator.

The arrangement and fastening of the cryostat on the stator breaks the mechanical linkage between the rotor and the superconducting winding and thereby eliminates a transfer of vibration from the rotor and driven mechanisms to the superconducting winding. This enhances the stability of its operation, while the cryostat breaks the thermal coupling through the coolant between the stator and rotor windings, made of a normal-conductivity conductor, which eliminates their mutual thermal effect.

It is expedient to construct the electrical machine so that the stator and the rotor are provided with cores separated into stacks by through radial passages and ensuring a constancy of the gap between the external surface of the cryostat and the normal-conductivity winding of the stator and of the gap between the internal surface of the cryostat and the rotor winding. Openings are made in the stator housing: in the bottom part, for the inlet of a gaseous coolant, and in the end walls, for the outlet of the heated gaseous coolant, disposed above the end parts of the stator winding sections; openings are provided in the rotor body for the passage of the gaseous coolant into the radial passages in the rotor; and end shields defining inlet chambers for the supply of the gaseous coolant, the chambers communicating with the inner space of the rotor body through said openings, are installed at the machine's front and rear parts.

The provision of the cores and separation of them in the axial direction into stacks and the formation of through radial passages therebetween, the provision of openings in appropriate sheets of the stator housing and rotor body and their connection in an appropriate manner to ensure the passage of the coolant by the above-described paths allow the specific (rated) power of the machine to be increased, while each of the windings (of the rotor and of the stator) has its own cooling system, which augments its efficiency because of the possibility of controlling the optimum coolant flow rates through the cooling circuits. Also, the coolant flow which cools the normal-conductivity stator winding undergoes an intermediate cooling before its passage through the passages between end parts of stator winding sections. This upgrades the winding cooling efficiency.

It is advisable that partitions to restrict the axial length of the gap between the cryostat internal surface and the rotor winding and to provide for the passage of the gaseous coolant in the passages between the end portions of rotor winding sections be installed at the end parts of the cryostat. Partitions to separate the flow of the gaseous coolant entering the inner space of the body from the flow of the heated gaseous coolant passing through the passages between the end portions of rotor winding sections are installed on the rotor.

The provision of partitions restricting the axial length of the gap between the cryostat internal surface and the rotor winding allows the air cooled in passing through the air gap by the rotor winding and by the internal surface of the cryostat housing to be used for cooling the end portions of the rotor winding, which affords temperature equalization over the winding length.

It is appropriate to provide casings at the end portions of the stator housing for collection and withdrawal of the heated gaseous coolant so that the casings define chambers communicating through openings in the stator housing end walls with the inner space of the stator and with the passages between the end portions of rotor winding sections.

Such casings for collection and withdrawal of the heated coolant, provided at the stator housing end parts, make it possible to isolate the machine from the environment and to employ a closed ventilation system.

It is effective that ribs supported on the cryostat external wall and stator core are installed, preferably in the axial direction, in the gap between the cryostat external surface and the normal-conductivity stator winding.

The provision of such ribs in the gap between the stator winding and the cryostat external surface and their fastening to the cryostat external wall enhances the stiffness of the wall and ensures the uniformity of the gap around the circumference.

BRIEF DESCRIPTION OF DRAWINGS

The exact nature of the invention will now be described by a detailed description of embodiments thereof with reference to the accompanying drawings, in which:

FIG. 5 illustrates the distribution of gaseous coolant flows among radial passages in the stator core;

FIG. 7 illustrates the withdrawal of the heated coolant from the machine.

DESCRIPTION OF THE PREFERRED EMBODIMENTS

Figure 1:
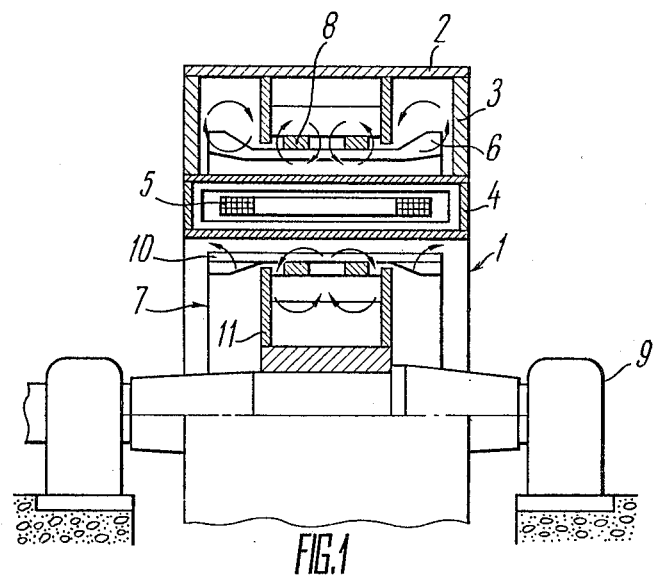
FIG. 1 illustrates, in a longitudinal section, an electrical machine constructed according to the invention.

Referring to FIG. 1, the proposed electrical machine comprises a stator 1 having a housing 2. A cryostat 4 housing a field winding 5 made of a superconductor is secured to end walls 3 of the housing 2. The winding is cooled in a conventional manner with the aid of a liquid coolant, such as liquid helium. The stator 1 also carries a winding 6 which balances the electromagnetic moment of a rotor 7, acting upon the superconducting winding 5. The winding 6 is constructed in a conventional manner from normal-conductivity conductors. Inasmuch as the winding 6 carries a current equal to the rated rotor current, a considerable amount of heat is released in it, and the winding should therefore be considered as one of the main electrical machine units to be cooled. According to the invention, the cryostat 4 is secured on the end walls 3 of the housing 2 in such a manner that a gap is defined between the external surface of the cryostat and the winding 6. In the embodiment being described, rings 8 are made on the internal surface of the housing 2, and the winding 6 is secured in a conventional manner on the rings 8.

The rotor 7 including a rotor body and shaft is mounted in rotation bearings 9 and carries a winding 10 constructed from normal-conductivity conductors, the winding 10 of the rotor 7 being disposed on a body 11 of the rotor.

An alternative embodiment of the invention is possible, wherein the stator 1 and the rotor 7 are provided with cores 12, 13 (FIG. 2), the cores being separated into stacks by through radial passages 14, 15, whose constant width is ensured by spacers 16.

The core 12 and 13 may be made of either ferromagnetic or diamagnetic materials. When the cores are made of a diamagnetic material, slots for reliably securing the winding in a known manner may be provided therein, but if they are of a ferromagnetic material, then the electromagnetic moment will be applied to the ferromagnetic core rather than to the windings as was the case in the above-described modifications; this greatly improves the operating conditions of the windings.

The introduction of the cores 12 and 13 ensures a constancy of the gaps between the cryostat surfaces and said cores, because cores can be made up with a higher accuracy than placing and fastening of the windings, and a machining can also be applied when required. The constancy of the amounts of said gaps offers an uniform distribution of coolant flows via the through radial passages 14, 15 and via the gaps between the stator and rotor windings and the corresponding walls of the cryostat.

Figure 2:
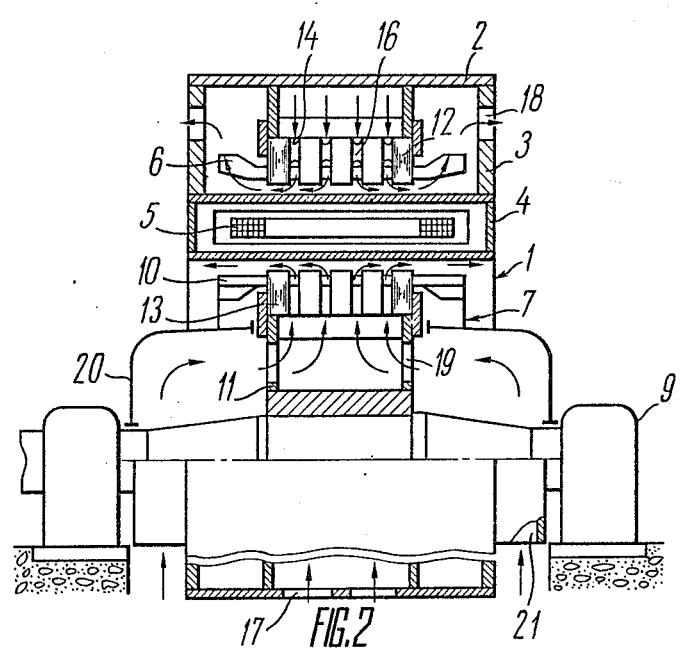
FIG. 2 illustrates a modification of the electrical machine with an open cooling system.
Figure 3:
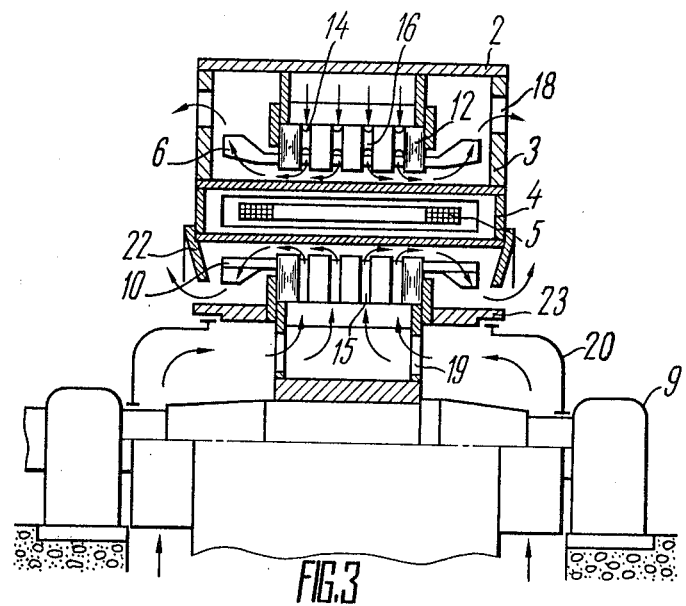
FIG. 3 illustrates a modification of the electrical machine, which provides a better cooling of the rotor winding.

Openings 17 to feed the gaseous coolant into the space between the stator core 12 and the stator housing 2 are provided in the bottom part of said housing. Openings 18 for the withdrawal of the heated gaseous coolant are provided in the end walls of the housing, above the end portions of sections of the winding 6. Openings 19 for the passage of the gaseous coolant into the space between the core 13 of the rotor 7 and the body 11 thereof are provided in the body 11 of said rotor. End shields 20 are installed at the front and the rear part of the electrical machine to define chambers communicating through the openings 19 with the inner space of the body 11 of the rotor 7 and intended for the supply of the gaseous coolant. Said coolant is fed into the chambers defined by the end shields 20 through openings 21 with the aid of a fan or another conventional device. The directions of coolant flow inside the electrical machine are shown in FIGS. 2 and 3 by arrows.

In the above-disclosed embodiment of the invention, an open system of a separate cooling of stator and rotor elements has been described.

An alternative modification of an open cooling system is possible. For a better cooling of the end portions of sections of the winding 10 of the rotor 7, partitions 22 (FIG. 3) extending from the internal surface of the cryostat 4 towards the winding 10 of the rotor 7 are secured to the end portions of the cryostat 4. In the embodiment being described, the partitions 22 are disposed radially.

The body 11 of the rotor 7 carries partitions 23 which extend in the axial direction in the zone of the end portions of sections of the winding 10 of the rotor 7 and are intended to shorten the axial length of the end shields and to separate the admitted and the withdrawn flow of the coolant from each other.

Figure 4:
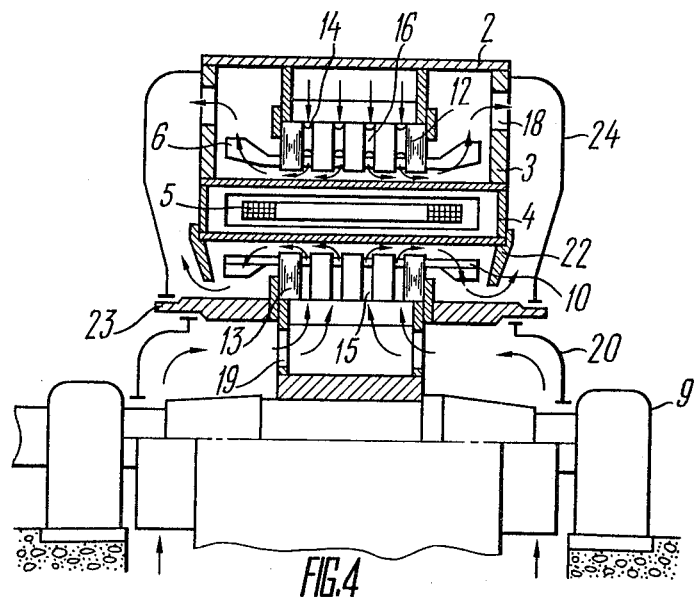
FIG. 4 illustrates a modification of the electrical machine with a closed cooling system.

FIG. 4 shows the preferable embodiment of the invention, wherein casings 24 are installed at the end portions of the housing 2 of the stator 1 to define chambers which communicate through the openings 18 in the end walls 3 of the housing 2 of the stator with the inner space of the latter and with the passages between the end portions of sections of the winding 10 of the rotor 7. This construction allows the heated gaseous coolant to be collected from the front and the rear part of the machine, to cool it, and to feed it again for cooling the machine through the openings 17 and 21.

The heated coolant may be cooled and fed into the openings 16 and 20 with the aid of conventional means, such as air coolers and fans.

Figure 6:
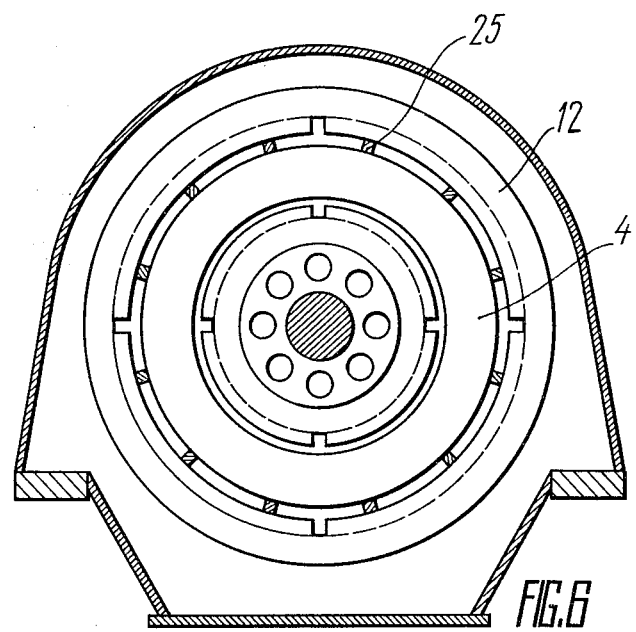
FIG. 6 illustrates a modification of the electrical machine, which allows enhancing the stiffness of the external enclosure of the cryostat.

To ensure stiffness of the external enclosure of the cryostat and uniformity of the gap between the external surface of the cryostat and the stator winding, ribs 25 (FIG. 6) are installed in this gap, preferably in the axial direction. The ribs 25 are supported on the external surface of the cryostat 4 and on the core of the stator 1 and may be secured, e.g., on the external surface of the cryostat 4.

The above-described machine functions as follows.

In the embodiment of the invention, illustrated in FIG. 1, the winding 6 of the stator is cooled through a convective heat exchange between the winding, the stator housing 2, and the surrounding atmosphere. The rotor 7 is cooled as well through a convective heat exchange between the winding 10 of the rotor 7 and the surrounding atmosphere. Rotation of the rotor 7 gives rise to a fan effect consisting in that the rotor winding 10, as extending in the radial direction, may be considered as an elementary fan which intensifies its own cooling. The intensity of its cooling depends on the rotational speed of the rotor 7.

In the embodiment of the invention, illustrated in FIG. 2, feeding the coolant into the stator housing 2 and cooling the winding of the stator 1 may be accomplished with the use of an outside fan (not shown in the drawing). In this case the coolant (air) is through the openings 17 in the bottom part of the stator housing 2 admitted into the space between said housing and the core 12 and distributed among the through radial passages 14 as indicated by arrows in FIGS. 2 and 5. The air passing through the radial passages 14 cools the slot part of the winding 6 and emerges into the air gap between the winding 6 and the external surface of the cryostat 4, where it separates into two oppositely directed flows. Passing through the gas, it flows over the external wall of the cryostat, whose temperature is lower than that of the air, whereby it gets partly cooled and then flows into the passages between the end portions of sections of the winding 6, and after cooling these portions, flows out through the openings 18.

The rotor 7 may be cooled either with the aid of an outside fan (not shown in the drawing) or through the self-ventilation in a manner similar to that described above. The choice between the two said cooling methods depends on the extent of the fan effect and in the final analysis on the rotation speed of the rotor 7.

When an outside fan is used, the cooling air flow is fed into the inlet chambers defined by the end shields 20, wherefrom it is through the openings 19 in the body of the rotor 7 directed from opposite ends into the space between the core of the rotor 7 and the body 11 of the rotor. Next, the air flows via the through radial passages 15 in the core of the rotor 7, cools the slot part of the rotor winding, and emerges into the air gap between the internal surface of the cryostat 4 and the core 13 of the rotor 7. In the gap, the air separates into two oppositely directed flows, and after passing through the gap, is ejected into the surrounding atmosphere.

In the event of the self-ventilation, the air head created by the rotating elements of the rotor should at least equal the head produced by the outside fan. Such a cooling method may be expedient in developing and operating electrical machines with a high rotational speed of the rotor.

In the embodiment of the invention, illustrated in FIG. 3, the partitions 22, 23 restrict the movement of air flows in the axial direction through the gap between the internal surface of the cryostat 4 and the winding 10 of the rotor 7 and direct the flows into the passages between the end portions of sections of the winding of the rotor 7. The coolant flow passing through said gap flows over the cryostat wall whose temperature is lower than that of the coolant (air), gets partly cooled and enters the passages between the end portions of sections of the winding of the rotor 7. Having emerged from the passages, the air is ejected into the atmosphere.

When an electrical machine is operated under such conditions that ejecting the heated coolant into the surrounding atmosphere is impossible or when the formation of a closed cooling system with the use of air coolers and fans is needed, the heated air emerging from the openings 18 in the end walls of the stator housing as well as the air emerging from the passages between the end portions of sections of the winding of the rotor 7 are collected in the casings 24, wherefrom they, are via branch pipes 26 (FIG. 7), withdrawn from the machine and fed to air coolers (not shown in the drawing).

When the ribs 25 are provided, the coolant flows passing through the gaps between the corresponding surfaces of the cryostat and the stator and rotor windings are separated into parallel flows.

The proposed electrical machine ensures the equalization of temperature over the length of the windings, which makes it possible to do away with local overheating as well as eliminate the transfer of rotor vibration to the cryostat, and thereby upgrades the stability of operation of the superconducting winding.

INDUSTRIAL APPLICABILITY

The present invention may be employed to the best advantage in the development and operation of powerful electrical machines.

We claim:

1. An electrical machine with a superconducting inductor and gas cooling of normal-conductivity windings, comprising a stator with a superconducting winding disposed in a cryostat and a rotor with a cooled winding disposed on its body, the rotor being mounted in rotation bearings, characterized in that the stator 1 carries a winding 6 which balances the electromagnetic moment of the rotor 7, acting upon the superconducting winding 5 of the stator, and which is made of normal-conductivity conductors, and the stator 1 is provided with a housing 2 to whose walls the cryostat 4 is secured so as to define a gap for the passage of a gaseous coolant between the external surface of the cryostat 4 and the normal-conductivity winding 6 of the stator.

2. An electrical machine as defined in claim 1, characterized in that the stator 1 and the rotor 7 are provided with cores 12, 13, separated into stacks by through radial passages 14, 15 and ensuring a constancy of the gap between the external surface of the cryostat 4 and the normal-conductivity winding 6 of the stator and of the gap between the internal surface of the cryostat 4 and the winding 10 of the rotor 7, openings 17, 18 are made in the stator housing 2, in the bottom part, for the inlet of the gaseous coolant, and in the end walls, for the outlet of the heated gaseous coolant, disposed above the end portions of sections of the stator winding 6, openings 19 are provided in the body 11 of the rotor 7 for the passage of the gaseous coolant into the radial passages 15 in the rotor, and end shields defining inlet chambers for the supply of the gaseous coolant, the chambers communicating with the inner space of the rotor body 11 through said openings, are installed at the machine front and rear parts.

3. An electrical machine as defined in claim 2, characterized in that partitions 22 restricting the axial length of the gap between the internal surface of the cryostat and the winding 10 of the rotor and providing for the passage of the gaseous coolant in the passages between the end portions of sections of the rotor winding 10 are installed at the end parts of the cryostat 4, and that partitions 23 which separate the flow of the gaseous coolant entering the inner space of the body from the flow of the heated gaseous coolant passing through the passages between the end portions of sections of the rotor winding 10 are installed on the rotor 7.

4. An electrical machine as defined in claim 3, characterized in that casings 24 are provided at the end portions of the stator housing 2 for collection and withdrawal of the heated gaseous coolant so that the casings 24 define chambers communicating via the openings 18 provided in the stator body and walls 3 with the inner space of the stator and with the passages between the end portions of sections of the rotor winding 10.

5. An electrical machine as defined in claim 4, characterized in that ribs 25 supported on the external wall of the cryostat 4 and on the stator core 12 are installed, preferably in the axial direction, in the gap between the external surface of the cryostat 4 and the normal-conductivity stator winding 6.

* * * * *